(No Model.)
C. F. HENIS.
DISINTEGRATOR AND STRAINER.
No. 248,930. Patented Nov. 1, 1881.
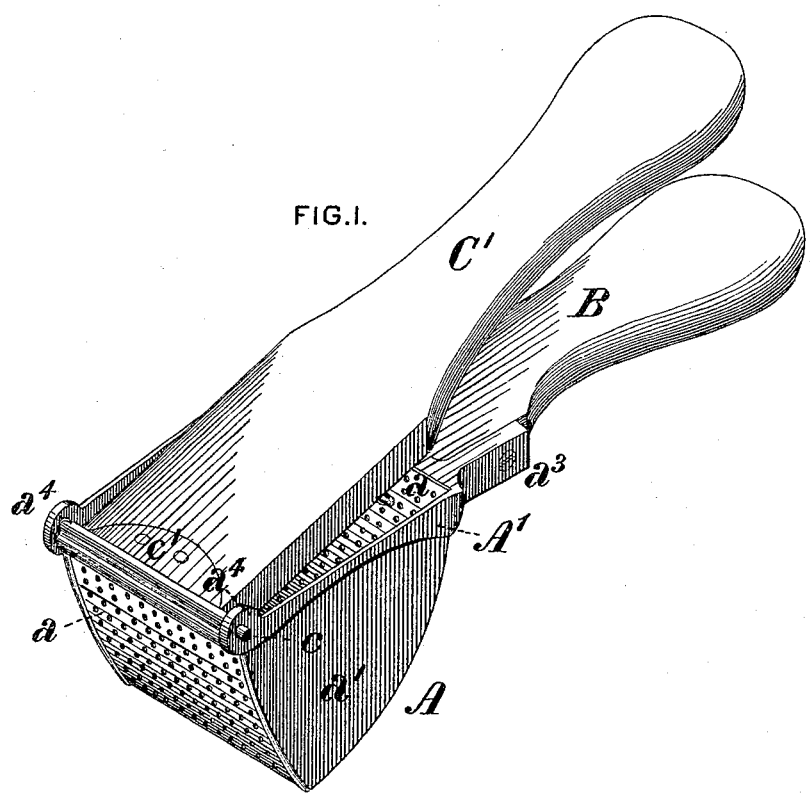
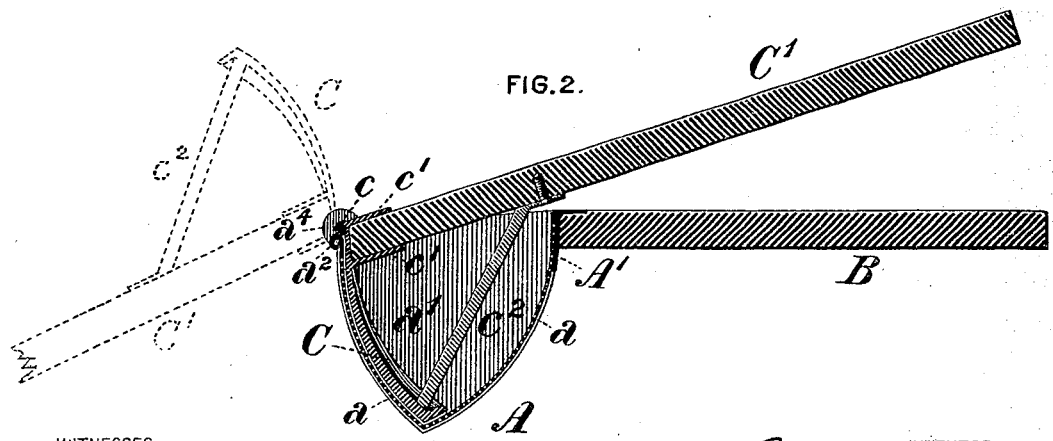
WITNESSES:
INVENTOR
Chas. F. Henis,
by Collier & Bell,
Attys.

UNITED STATES PATENT OFFICE.

CHARLES F. HENIS, OF PHILADELPHIA, PENNSYLVANIA.

DISINTEGRATOR AND STRAINER.

SPECIFICATION forming part of Letters Patent No. 248,930, dated November 1, 1881.

Application filed August 29, 1881. (No model.)

*To all whom it may concern:*

Be it known that I, CHARLES F. HENIS, of the city and county of Philadelphia, in the State of Pennsylvania, have invented certain new and useful Improvements in Disintegrators and Strainers, of which improvements the following is a specification.

The object of my invention is to provide a simple and efficient implement for preparing fruit and vegetables for the table by the division or disintegration thereof into filamentous particles, which implement shall also be suitable for use as a strainer or colander for separating liquid and solid constituents of various articles of food.

To this end my improvements consist in the combination of a cup or receptacle, one or more of the side plates of which are perforated, and a plunger or pressing-plate pivoted to said receptacle and vibratile toward and from one of its perforated side plates about an axis adjacent to one of the ends of said plate; also, in the combination of a perforated receptacle, a handle attached rigidly thereto, and a pressing-handle pivoted to the receptacle and carrying a plunger or pressing-plate adapted to be vibrated within and withdrawn from the receptacle by the pressing-handle.

The improvements claimed are hereinafter more fully set forth.

In the accompanying drawings, Figure 1 is an isometrical view of a disintegrator and strainer embodying my improvements, and Fig. 2 a vertical longitudinal central section through the same.

To carry out my invention I construct of stout sheet metal a cup or receptacle, A, the most convenient form of which is that shown in the drawings—to wit, of quadrangular section at top, and having two curved sides, $a$, which meet in a right line at the bottom of the receptacle, and two flat sides, $a'$, at right angles to said meeting line. The sides $a$ are preferably formed of a single plate bent into the desired curves, which plate, together with the flat side plates, $a'$, is soldered to a metallic frame, $A'$, which surrounds the mouth of the receptacle on three sides, and, in connection with a brace rod or wire, $a^2$, crossing the remaining side, serves to impart proper rigidity to the receptacle. Arms $a^3$ on the side of the frame opposite the brace-rod serve for the attachment of a handle, B, by which the receptacle is supported. One or both of the curved sides $a$ is perforated throughout with small circular openings, through which, in the operation of the implement, the articles to be treated are expressed in filamentous fragments by a pressing-plate, C, secured upon a shaft, $c$, mounted in lugs $a^4$ upon the frame $A'$, on the side opposite that to which the handle B is attached. A pressing-handle, $C'$, is secured to lugs $c'$ on the upper end of the pressing-plate, and an angle-brace, $c^2$, extends from the free end of the pressing-plate to the pressing-handle. The pressing-plate C is curved similarly to the perforated side $a$, adjacent to which its shaft is pivoted, and its length is such that in its traverse it shall sweep close to the surface of the other perforated side, the axis of curvature of which coincides with the axial line of the shaft $c$, so that in the downward traverse of the pressing-plate the compressed material in the receptacle cannot pass behind the pressing-plate, and must therefore find exit only through the perforations of the sides $a$, the particles of skin, seeds, lumps, or other refuse remaining in the receptacle, from which they are removed after the expression of the edible portions.

The pressing plate and handle may be swung entirely clear of the receptacle, as shown in dotted lines in Fig. 2, in which position the implement is suited for use as a strainer or colander, and the thorough cleansing of the receptacle, either by scraping or washing, or both, can be readily performed.

I do not limit myself to the specific form of receptacle or number of perforated sides herein shown and described, as the same may be varied without departing from the spirit of my invention.

I claim as my invention and desire to secure by Letters Patent—

1. In a disintegrator and strainer, the combination of a cup or receptacle having one or more perforated side plates and a pressing-plate which is vibratile toward and from one of said perforated side plates about an axis adjacent to one end thereof, substantially as set forth.

2. In a disintegrator and strainer, the combination of a perforated cup or receptacle, a handle fixed thereto, and a handle pivoted to the receptacle and carrying a pressing-plate adapted to be vibrated therein or entirely withdrawn therefrom, substantially as set forth.

3. In a disintegrator and strainer, the combination, substantially as set forth, of a cup or receptacle having a perforated side plate or plates, a frame secured to said receptacle around its mouth or opening, a handle rigidly secured to one side of said frame, and a pressing plate and handle pivoted to the opposite side of said frame.

CHAS. F. HENIS.

Witnesses:
J. SNOWDEN BELL,
ISAAC H. O'HARRA.